(12) United States Patent  
Herron

(10) Patent No.: US 6,622,352 B2
(45) Date of Patent: Sep. 23, 2003

(54) QUICK-RELEASE WIRE HANGER

(75) Inventor: David M. Herron, Yakima, WA (US)

(73) Assignee: Clip-N-Stay, Yakima, WA (US)

( * ) Notice: Subject to any disclaimer, the term of this patent is extended or adjusted under 35 U.S.C. 154(b) by 0 days.

(21) Appl. No.: 09/946,299

(22) Filed: Sep. 4, 2001

(65) Prior Publication Data

US 2003/0051319 A1 Mar. 20, 2003

(51) Int. Cl.[7] .................................................. F16B 7/00
(52) U.S. Cl. .......................... 24/563; 24/336; 24/370; 248/229.26; 52/688; 403/397
(58) Field of Search .......................... 24/459, 536, 336, 24/339, 370, 563, 570, 545; 52/686, 688, 715, 719; 248/229.26; 403/394, 397, 400; 256/47, 48, 54

(56) References Cited

U.S. PATENT DOCUMENTS

| | | | | |
|---|---|---|---|---|
| 499,568 A | * | 6/1893 | Nowotny et al. | ........ 403/397 X |
| 977,704 A | * | 12/1910 | Brownlee | .................... 52/686 |
| 1,627,575 A | * | 5/1927 | Rovelli | ................. 248/229.26 |
| 2,643,046 A | | 6/1953 | Hunphreys | ...................... 229/6 |
| 3,164,250 A | | 1/1965 | Paxton | ........................ 206/56 |
| 3,334,805 A | | 8/1967 | Halbach | ....................... 229/62 |
| 3,357,148 A | * | 12/1967 | Turner | ...................... 52/715 X |
| 3,417,912 A | | 12/1968 | Paxton | ......................... 229/62 |
| 3,512,329 A | * | 5/1970 | Du Plessis | ................ 52/715 X |
| 3,638,894 A | * | 2/1972 | Leutenegger | ............ 248/230.1 |
| D230,728 S | | 3/1974 | Richman | .................... D16/1 R |
| 4,142,714 A | | 3/1979 | Diepeveen | ..................... 269/8 |
| 4,168,423 A | * | 9/1979 | Gilreath | ..................... 24/336 X |
| 4,309,120 A | * | 1/1982 | Werthmann | ............... 24/339 X |
| 4,354,299 A | | 10/1982 | Maidhof | ................... 24/261 R |
| D285,287 S | | 8/1986 | Tannar | ......................... D9/434 |
| 4,662,035 A | | 5/1987 | Hatfield | ..................... 24/135 R |
| 4,943,183 A | | 7/1990 | Nakano | .................... 403/406.1 |
| 5,142,745 A | | 9/1992 | Setty et al. | ............... 24/136 R |
| 5,209,439 A | | 5/1993 | Coll | ............................ 248/65 |
| 5,305,804 A | | 4/1994 | Peder | ......................... 140/115 |
| 5,358,423 A | * | 10/1994 | Burkhard et al. | ......... 24/336 X |
| 5,533,239 A | * | 7/1996 | Gall | ............................. 24/339 |
| D386,076 S | | 11/1997 | Moore | ......................... D8/394 |
| D398,836 S | | 9/1998 | Kalat | .......................... D8/370 |
| 5,869,785 A | | 2/1999 | Bechamps et al. | ...... 174/40 CC |

OTHER PUBLICATIONS

Stainless Steel Rebar Home Page, Copyright ©1998, 1999, 2000 Tullmin Consulting, Ontario Canada.

* cited by examiner

Primary Examiner—Robert J. Sandy
(74) Attorney, Agent, or Firm—Seed IP Law Group PLLC

(57) ABSTRACT

A quick-connect/quick-release wire hanger provided in a variety of configurations for use in a variety of applications. The wire hanger of the invention is formed of a substantially planar center portion having first and second pairs of opposing peripheral edges, such as a square or rectangle. A first pair of wire clips extends from the first pair of opposing peripheral edges and are angled upwardly relative to the planar center portion, each of the pair of wire clips includes a hook portion. A second pair of wire clips extends from the second pair of opposing peripheral edges and are angled downwardly relative to the planar center portion, each of the second pair of wire clips also includes a hook portion.

19 Claims, 12 Drawing Sheets

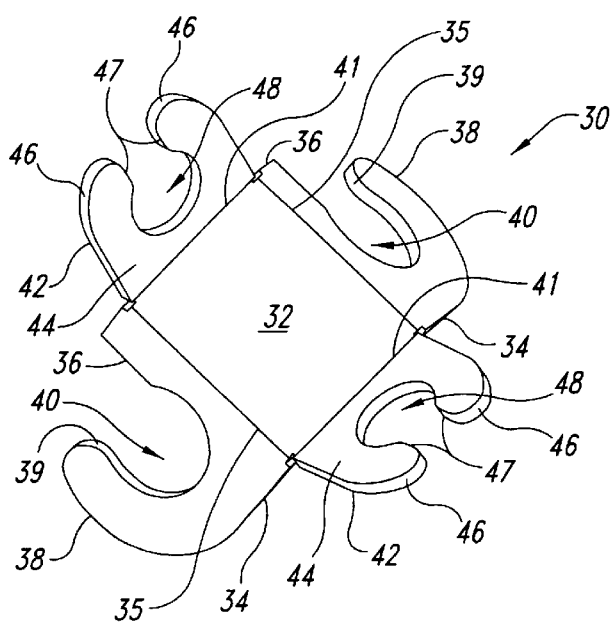
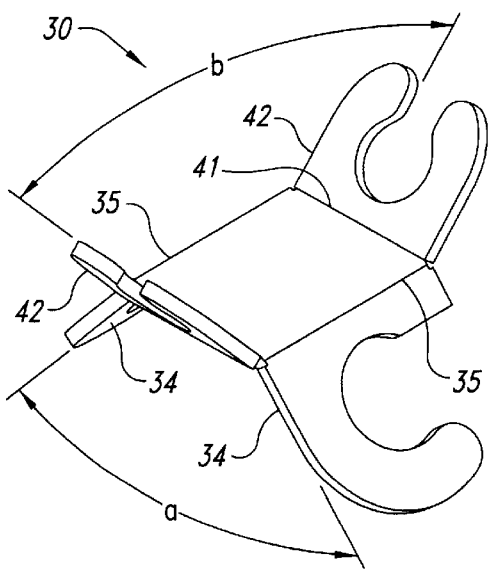
Fig. 3A      Fig. 3B
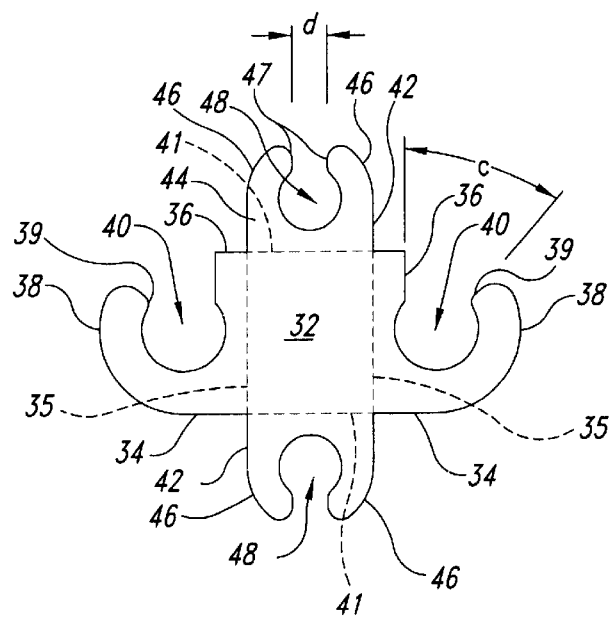
Fig. 4

QUICK-RELEASE WIRE HANGER

TECHNICAL FIELD

This invention relates to wire clamping devices, and more particularly, to quick-release wire clamping devices.

BACKGROUND OF THE INVENTION

A variety of applications exist in which arrays or "nets" of wires, cables, or rods are useful. In agriculture, for example, growers often use networks of metal wires to support plants during the growing season. In another example, vast arrays of rebar are constructed to support heavy layers of concrete in the construction of foundations for single family homes, apartment buildings, office buildings, up through sky scrapers. The road construction industry uses networks of rebar to reinforce concrete structures from driveways and parking spaces in front of our homes through super highways and massive bridges. In many of these applications, ties at the intersections where one wire or bar crosses another have been found useful for stabilizing the network. The prior art describes both permanent and semi-permanent means for securing one wire to another at these crossings. The prior art devices involve, for example, wires twisted around each crossing in the network, as described in U.S. Pat. No. 5,305,804. Other prior art devices involve complicated threaded nut-and-bolt clamp assemblies, such as the clamp described in U.S. Pat. No. 4,662,035. Each of these solutions are time consuming and labor intensive, requiring the installer to initially twist the wires or thread the clamps at each of hundreds or even thousands of crossings. Disassembly requires additional time and labor to untwist the wires or unbolt the clamps. Furthermore, each of these solutions is generally unsuccessful, the wire ties or clamps tending to slip along one wire when the cross wire is loaded along the axis of the other wire.

In construction, support chairs for rebar networks in foundations and road beds are also known for supporting heavy rebar reinforcement networks while cement or concrete is poured. These support chairs are generally configured as one- or two-legged pedestals with a semi-circular slot in the top for receiving the rebar. The rebar may be wire-tied into the chair or, in some instances, may be snapped into place, but known support chairs do not generally provide for joining the rebar at crossings without additional wire ties or clamps installed after the rebar is laid. Some quick-connect wire clips for rebar are known, but typically these rely on the rough surface of the rebar to prevent slipping.

SUMMARY OF THE INVENTION

The present invention provides a quick-connect/quick-release wire hanger in a variety of configurations for use in a variety of applications. According to one aspect of the invention, the wire hanger is formed of a substantially planar center portion having first and second pairs of opposing peripheral edges, such as a square or rectangle. A first pair of wire clips extends from the first pair of opposing peripheral edges and are angled upwardly relative to the planar center portion, each of the first pair of wire clips includes a hook portion. A second pair of wire clips extends from the second pair of opposing peripheral edges and are angled downwardly relative to the planar center portion, each of the second pair of wire clips also includes a hook portion. In one embodiment, at least some of the hook portions form a sharp edge.

According to another aspect of the invention, the hook portion of each of the first pair of wire clips includes first and second spaced apart hook portions forming an opening therebetween. Optionally, the first hook portion of each of the first pair of wire clips faces the second hook portion across a plane passing between the first and second hook portions of each of the first pair of wire clips.

According to another aspect of the invention, the hook portion of each of the second pair of wire clips includes a base portion spaced apart from a tip of the hook portion. Optionally, openings formed in both of the second hook portions face in the same direction. Alternatively, the openings formed in the second hook portions face in different directions.

According to one aspect of the invention, the wire hanger includes a pair of leg portions that extend from the first pair of opposing peripheral edges and are angled downwardly relative to the planar center portion.

According to still another aspect of the invention, the center portion of the wire hanger is further configured with an elongated rectangular shape with one pair of clips formed along the short sides and another pair of clips formed along central portions of the long sides intermediate between the pair of clips formed along the short sides. An arm extension is thus formed between each of the clips on the short sides and the clips formed intermediately along the long side. The arm extensions provide a degree of flexibility within the wire hanger.

BRIEF DESCRIPTION OF THE DRAWINGS

FIGS. 3A and 3B are isometric views of one embodiment of the wire hanger of the invention.

FIG. 4 illustrates a flat pattern before final forming of the wire hanger illustrated in FIGS. 3A and 3B.

DETAILED DESCRIPTION OF THE INVENTION

The present invention is directed to a quick-connect/quick-release wire hanger formed in a variety of configurations and useful in a variety of applications, such as agriculture, and building and highway construction.

Figure 1:
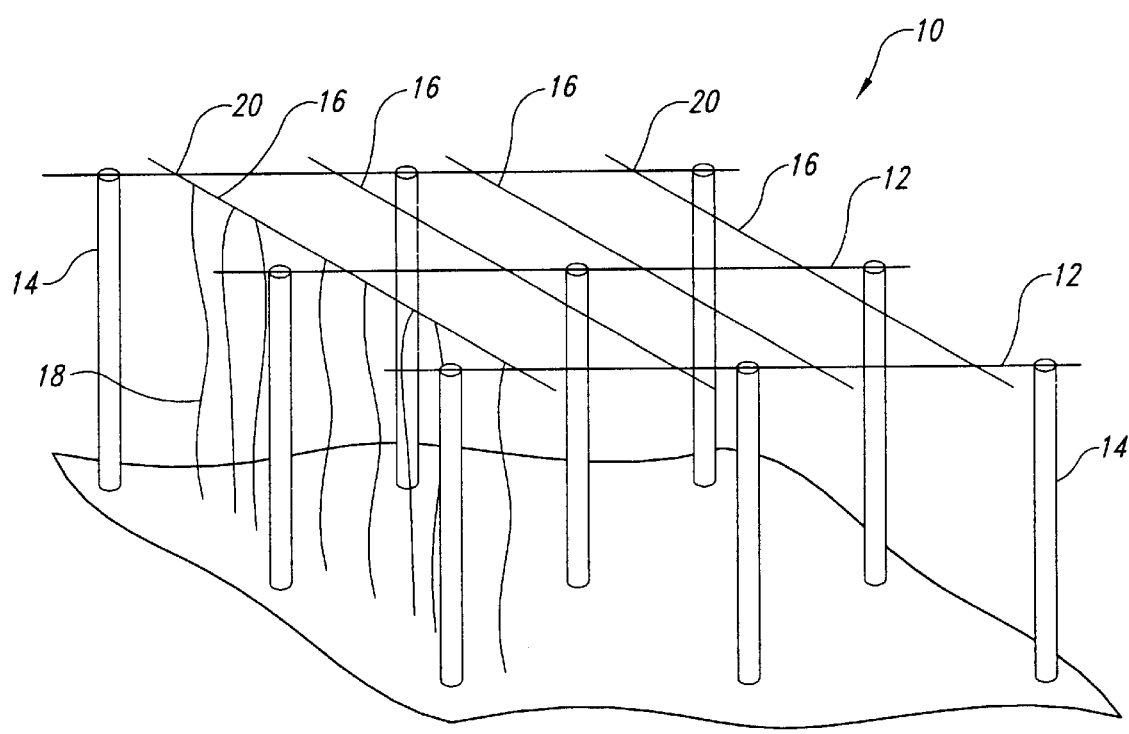
FIG. 1 is an illustration of the network of support wires used in supporting hop plants through the growing season.

FIG. 1 illustrates the network of crossing wires in an agricultural application to support plants, such as hop plants, in evenly spaced rows throughout the growing season. This configuration of support wires allows the hops maximum exposure to sunlight throughout the day. The network 10 is composed of a series of heavy gauge guide wires 12, usually about ⅜ inch diameter, resting atop an array of support posts 14 spread over many acres. A series of top wires 16, usually about ¼ inch diameter, lay crosswise on top of the guide wires 12. Lengths of twine 18 hang from the top wires 16. Hanging twine 18 are discussed below in connection with FIG. 2. In a conventional system, the network 10 of guide wires 12 and top wires 16 is assembled with wire ties or nut-and-bold clamps at each crossing 20. The assembled network 10 is secured to the tops of the support posts 14 by the guide wires 12.

Figure 2:
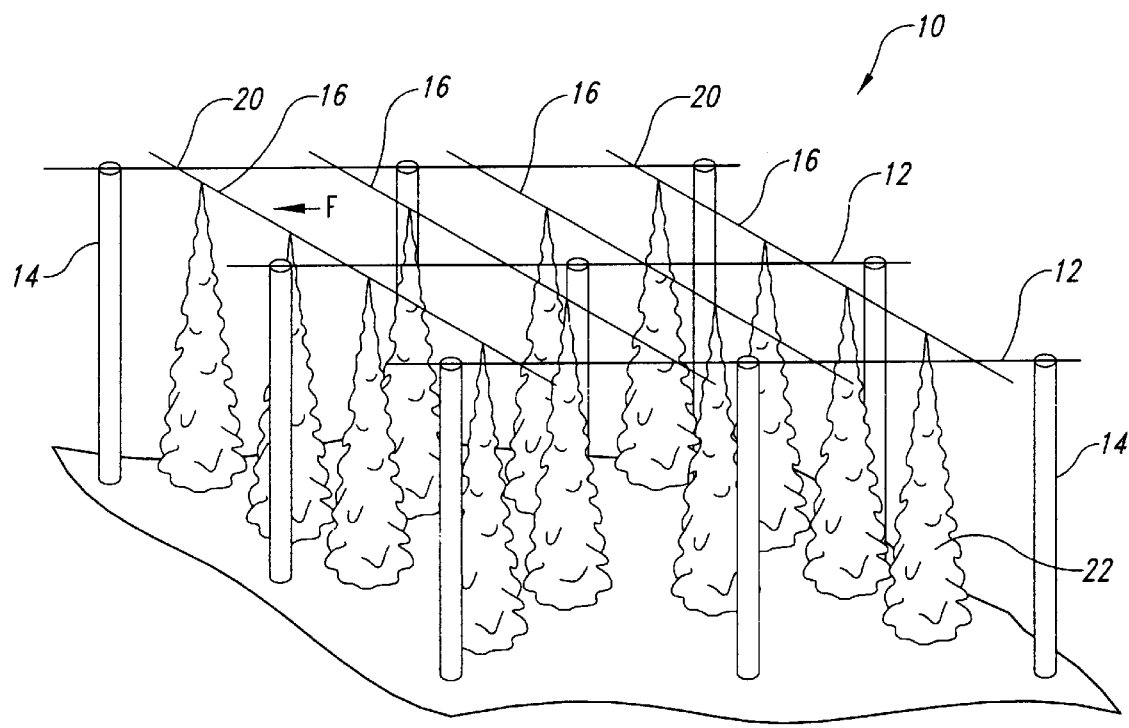
FIG. 2 illustrates a row of hop plants growing with the support of the network of wires illustrated in FIG. 1.

FIG. 2 illustrates a quantity of hop plants 22 growing along hanging lengths of twine 18. In practice, many lengths of twine 18 are hung from each top wire 16 and a plant 22 grows about each length of hanging twine 18. As the plants 22 mature, each gains a large amount of foliage. In windy weather, the foliage on the individual plants 22 combines to form a large sail area, such that wind incident on the foliage exerts a force, F, which often acts along the guide wires 12, as indicated by the arrow.

Conventional wire ties and nut-and-bolt clamps are generally unable to provide sufficient gripping power to resist the force F exerted by heavy winds. As a result, the top wires 16 tend to slide along the guide wires 12 in the direction that the wind pushes, allowing the plants 22 to move. The top wires 16 and plants 22 crowd against the support posts 14, with each row of plants partially shading the other. The top wires 16 must be manually repositioned to provide the desired even spacing between rows of plants 22. Such a process is labor-intensive and may result in damage to the plants 22. In extremely windy conditions, the direction and intensity of the wind force F crowds the plants 22, causing the guide wires 12 to break loose from the tops of the support posts 14, so that part or all of the hop field falls to the ground. The process of raising the guide wires 12 along with the top wires 16 and the plants 22 hanging therefrom back atop the support posts 14 and resecure them thereto is also labor-intensive and may cause significant damage to the plants.

One embodiment of the present invention provides a quick-release wire hanger having a particular usefulness in maintaining the relative positioning of the crossing wires, such as the top wires 16 crossing the guide wires 12 an agricultural application. The quick-release wire hanger is also useful for securing crossing wires that must be readily separated.

FIGS. 3A and 3B together illustrate one embodiment of a wire hanger 30 of the invention. FIGS. 3A and 3B are each pictorial views of the wire hanger 30 of the invention from different points of view. Briefly, the wire hanger 30 comprises a square or rectangular center portion 32 of heavy gauge galvanized or stainless steel formed with cruciform tabs projecting from each of its four peripheral edges. For example, one embodiment of the invention is formed using heavy gauge stainless or galvanized steel in the range of 12–16 gauge.

According to the embodiment illustrated in FIGS. 3A and 3B, the center portion 32 is substantially planar. A pair of substantially identical tabs 34 are formed on opposite edges of the center portion 32 and are bent about bend lines 35 toward each other over the body of center portion 32 to form an included angle a, best illustrated in FIG. 3B. Each of the tabs 34 is formed with a respective base portion 36 adjacent to the center portion 32 and a respective curved or angular hook portion 38 extending from the center portion 32. The hook portions 38 each terminate in a rounded hook tip 39 facing toward, but spaced away from the corresponding base portion 36. Each of the hook portions 38 in combination with the corresponding base portions 36 forms an aperture 40 therebetween.

The wire hanger 30 is also formed with a pair of substantially identical tabs 42 projecting outwardly from the other two opposing edges of the center portion 32 and bent about bend lines 41 toward each other on an opposite side of center portion 32 from the tabs 34. The tabs 42 bend toward each other over the body of the center portion 32 to form an included angle b therebetween. Each of the tabs 42 is formed with a corresponding base portion 44 from which pairs of curved or angular hook portions 46 project. Each of the hook portions 46 terminates in a rounded hook tip 47. Each pair of hook portions 46 is formed in a spaced-apart opposing configuration whereby a corresponding aperture 48 is formed therebetween.

According to an exemplary embodiment of the invention, the included angles a and b are substantially identical. Furthermore, each of the tabs 34 and the tabs 42 may be bent to form substantially identical angles with the center portion 32 of the wire hanger 30. Thus, by way of example, each of the tabs 34 and each of the tabs 42 forms an angle with the center portion 32 in the range of about 47° to 51°.

FIG. 4 illustrates a flat pattern shape of the wire hanger 30 at a manufacturing stage prior to bending of the tabs 34 to form the included angle a and the tabs 42 to form the included angle b. As illustrated in FIG. 4, the apertures 40 formed by the curved hook portions 38 in combination with the corresponding base portions 36 are generally circular or oval in form. Alternatively, the apertures 40 are angular in form (not shown) when the hook portions 38 are angular in form. The apertures 48 in the tabs 42 are similarly formed with a generally circular or oval shape when the respective pairs of hook portions 46 are formed with a curved shape. The pairs of hook portions 46 are alternatively formed with an angular shape whereby the respective apertures 48 are also angularly shaped (not shown).

According to one embodiment of the invention, the wire hanger 30 is configured for use with the network 10 of the guide wires 12 and 16 (shown in FIG. 1) to stabilize the top wires 16 in relationship to the guide wires 12 in an agricultural application, such as, by way of example, a hops field. Accordingly, the tip 39 of each of the hook portions 38 is spaced away from the corresponding base portion 36 to form a predetermined angular opening c into the corresponding aperture 40 that is configured to accept the guide wire 12. Furthermore, the hook portions 38 are formed in a curved configuration whereby apertures 40 are generally circular and adapted to the size of the guide wires 12. For example, the apertures 40 define a ½ inch diameter opening to accept the ⅜ inch diameter of the guide wires 12 when the apertures 40 intersect a generally straight portion of the guide wire at an angle of determined by the bend angle between the tabs 34 and the plane of the center portion 32.

The tips 47 of the pairs of hook portions 46 are spaced apart a predetermined distance d into the corresponding aperture 48 that is configured to accept the wire 16 thereinto. The hook portions 46 are formed with a curved configuration whereby apertures 48 are generally circular and adapted to the size of the wires 16. For example, the apertures 40 are approximately ⅜ inch diameter and the distance d forming the opening between the hook tips 47 is between about 2/10 inch and ¼ inch for use with the standard ¼ inch top wires 16 used in many hop fields. This variation in the size of the opening provides for either a snug fit or a looser fit of the wires 16.

According to the embodiment illustrated in FIGS. 3A, 3B and 4, the openings into the apertures 40 both face in the same direction, whereby a wire, such as the guide wire 12, is engaged using a force acting perpendicularly to the guide wire presented simultaneously at the mouths of both apertures 40, as opposed to a twisting or rotational force that would be required to engage a wire if the openings faced in opposite directions. Wire installation equipment to provide the force acting perpendicularly to the guide wire 12 is expected to be of a simpler nature than the equipment required to provide the twisting or rotational force. However, the invention is not intended to be limited by the configuration illustrated in FIGS. 3A and 3B. Rather, alternative embodiments of the wire hanger 30 of the invention include wire clips having openings into apertures 40 which face in opposite directions and require a rotational or twisting motion for installation onto the guide wire 12.

Figure 5:
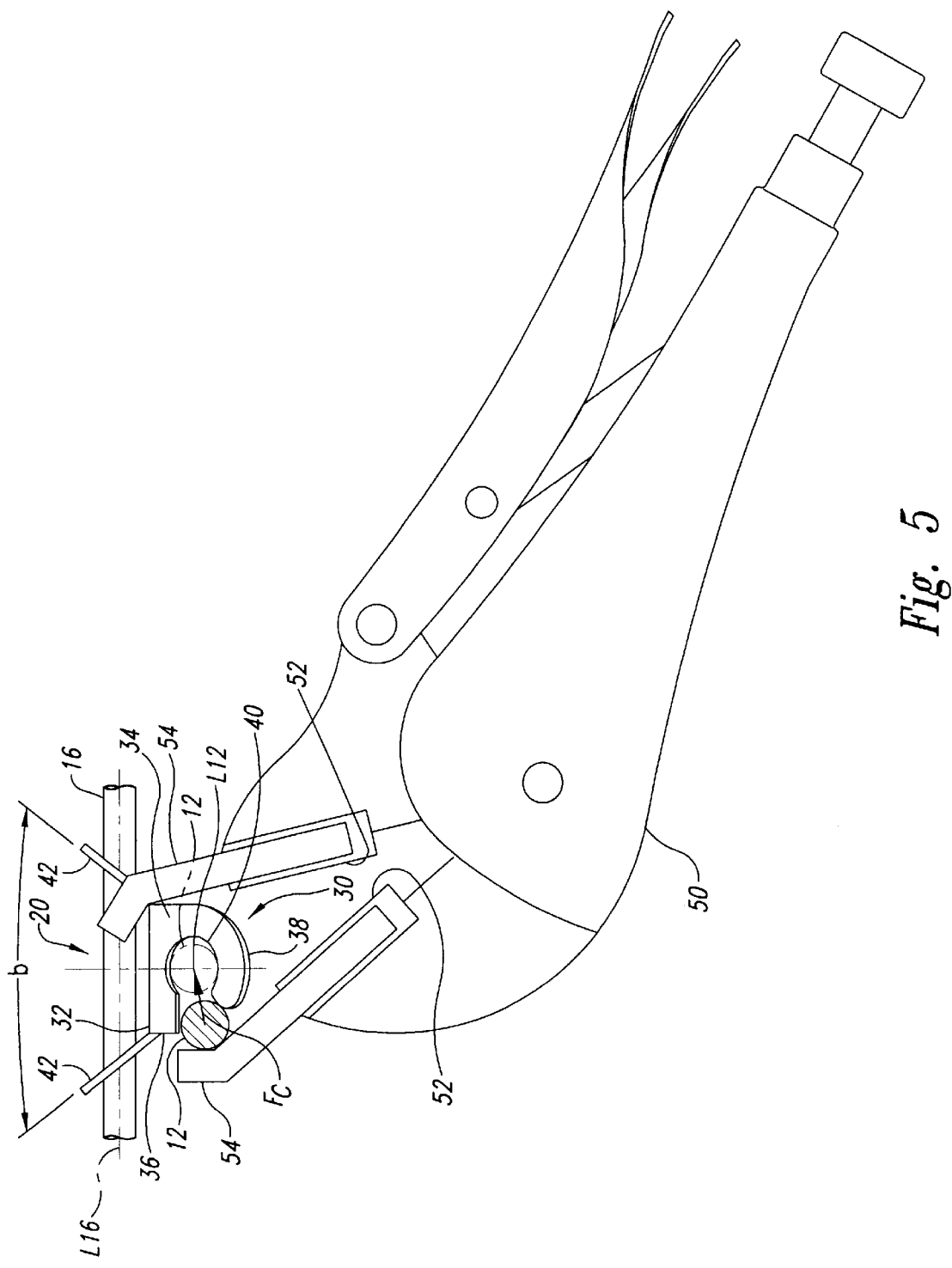
FIG. 5 illustrates the installation onto a wire of the wire hanger illustrated in FIGS. 3A and 3B.

FIG. 5 illustrates a technique for installing the wire hanger 30 onto one of the guide wires 12 when the opening into the apertures 40 face in the same direction. In FIG. 5, the wire 16 is already installed on the wire hanger 30. The installation of the wire 16 is discussed in detail below. The opening in tab 34 between the base portion 36 and the hook portion 38 provides access into the aperture 40, as described above. The opening is brought into the vicinity of the guide wire 12.

A pliers 50 is used to exert a clamping force, $F_c$, to move the guide wire 12 through the opening in the tab 34 and into the aperture 40. The opposing jaws 52 of the pliers 50 are formed with pincers 54 at their tips. While only one tab 34 is illustrated in FIG. 5, the operation of forcing the guide wire 12 into the aperture 40 is identical for the other tab 34, and may be conveniently performed simultaneously therewith. According to one configuration, the pincers 54 of the opposing jaws 52 are formed with a curved or angular hook portion for holding both the wire hanger 30 and the guide wire 12 within the pincers 54 while the jaws 52 of the pliers 50 close so that neither piece slips away. The pliers 50, although shown as a locking pliers, is optionally a self-adjusting pliers, a slip-joint pliers, or another equivalent squeezing mechanism for applying the clamping force $F_c$.

Figure 6A:
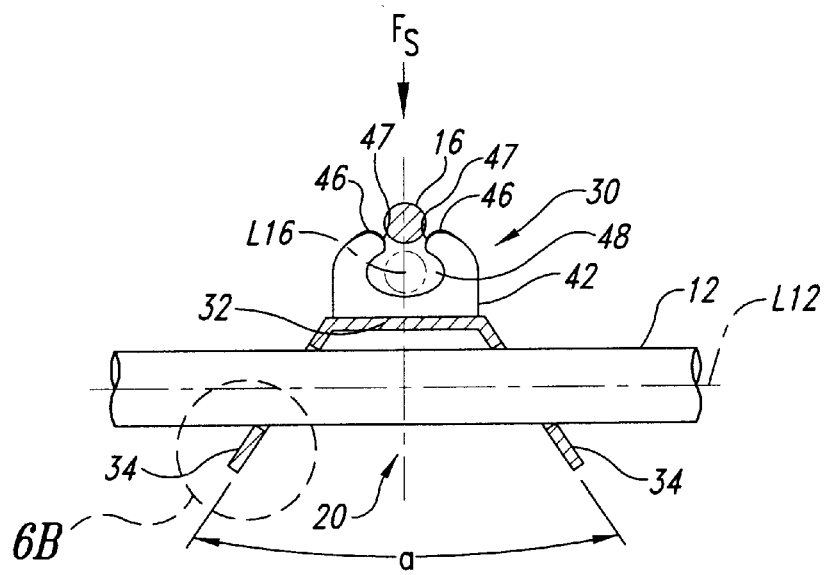
FIG. 6A illustrates the wire hanger illustrated in FIGS. 3A and 3B installed onto crossing wires.

FIG. 6A illustrates installation of the wire hanger 30 of the invention (shown in cross-section) between the guide wire 12 and the top wire 16 at a crossing point 20, as shown in FIGS. 1 and 2. The wire hanger 30 is installed on the guide wire 12 at the intended crossing point 20 in the manner described above. The crossing top wire 16 is subsequently positioned at the opening between the tips 47 of the pair of hook portions 46 leading into the apertures 48 in the opposing tabs 42. A force, $F_S$, is exerted to squeeze the top wire 16 between the jaws of the pair of hook portions 46, as indicated by the arrow. The distance d between the tips 47 of the pair of hook portions 46 (shown in FIG. 4) may be sized to permit a manually applied force $F_S$ to install the top wire 16 into the apertures 48. As described above, the apertures 48 are preferably sized larger than the top wire 16, while the opening between the jaws of hook portions 46 is smaller than the diameter of top wire 16. Therefore, the force $F_S$ pressing the top wire 16 into the aperture 48 forces the tips 47 of hook portions 46 apart sufficiently to allow the top wire to pass between. The spring qualities of the material (e.g., heavy gauge steel) used in forming the wire hanger 30 causes the tips 47 of hook portions 46 to close again around the top wire 16, capturing it therebetween.

As described, the wire hanger 30 includes two pair of tabs: tabs 34 and tabs 42. The respective apertures 40 and 48 formed therein are sized larger than the corresponding wires intended to be captured thereby. However, the wire hanger 30 of the invention successfully captures and holds each of the guide wire 12 and the top wire 16 against forces that would cause prior art devices to slip. The holding power of the wire hanger 30 is provided in part by the strength and spring properties of the steel material used in its fabrication. For example, according to one embodiment of the invention, a ½ hard 304 or 316 stainless steel material provides adequate spring properties.

Figure 6B:
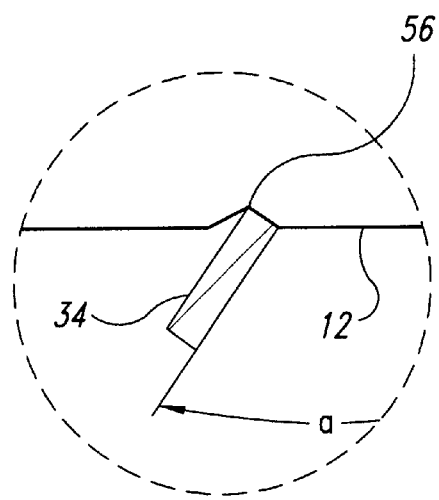
FIG. 6B is an enlarged fragmentary view of the wire hanger of FIG. 6A.

FIG. 6B illustrates the contribution of the included angles a and b between respective pairs of tabs 34 and 42 to the holding power of the wire hanger 30. For example, the apertures 40 in the tabs 34 are nominally larger than the diameter of the guide wire 12 captured therein. However, when the pair of tabs 34 together capture a single guide wire 12, as shown in FIG. 6, each of the apertures 40 is presented to the longitudinal axis L12 of the guide wire 12 at angle approximately equal to one half of the included angle a. This angular presentation significantly reduces the cross-sectional area of the apertures 40 as measured perpendicular to the longitudinal axis L12. The width of the apertures 40 is reduced as a function of the included angle a as presented to the longitudinal axis L12 of the guide wire 12, so that the widths of the apertures 40 measured perpendicularly to the guide wire 12 are smaller than the cross-sectional diameter of the guide wire 12.

Relative motion between the wire hanger 30 and the guide wire 12 (i.e., the tabs 34 sliding along the longitudinal axis L12 of the guide wire 12) can only occur if the guide wire 12 slides through each of the smaller apertures 40 simultaneously. The heavy gauge steel material used to manufacture the wire hanger 30 combined with the physical configuration of the wire hanger is very stiff. The guide wire 12 is also very stiff over the short distance in which the guide wire engages the wire hanger 30. Therefore, the included angle a generates a spring pressure that presses the tabs 40 against the guide wire 12, which holds the wire hanger 30 in a fixed position relative to the guide wire. Each of the apertures 40 and 48 is further formed with a sharp juncture or edge along an interior portion of each aperture 40 and 48. The sharp edge 56 may be readily produced as part of the manufacturing process, resulting from sheet metal stamping equipment used to shape the flat pattern. The sharp edge 56 is useful in maintaining the relative positions between the top wires 16 and the guide wires 12.

Following installation, the spring pressure exerted by the tabs 34 presses the sharp edges of the apertures 40 into the guide wire 12. The scale of FIG. 6B is greatly exaggerated to illustrate the engagement of the sharp edge 56 and the guide wire 12. The steel material of which the wire hanger 30 is formed may be as hard or harder than the top wire 16 used in most agricultural applications, including the growing of hop plants 22. The relative hardness of the wire hanger 30 causes the sharp edge 56 of the aperture 40 to dig into the softer guide wire 12, which increases the resistance to relative motion.

The pairs of tabs 42 on the opposite side of the center portion 32 from the pair of tabs 34 interact similarly with the smaller top wire 16. That is, the included angle b reduces the effective cross-section of the aperture 42 and the sharp edges (not shown) of the aperture 48 retains the top wire 16 in fixed position with respect to the guide wire 12. Thus, a significant resistance to relative motion is applied between the wire hanger 30 and both the guide wire 12 and the top wire 16 at the crossing point 20.

The opening into apertures 48 between pairs of opposing hook portions 46 permits the top wire 16 to be installed and removed perpendicularly to the guide wire 12, which is particularly useful in the hop fields if inclement weather causes the field to fall (i.e., the guide wires 12 to fall from the tops of the support posts 14). In such instance, the top wires 16 supporting the hop plants 22 can be lifted vertically from the ground by pulling them straight up between the tips 47 of the hook portions 46 to thereby disengage the top wire form the wire hanger 30. Separation of the top wires 16 from the wire hangers 30 readily accommodates the equipment and methods presently in use for reinstalling the guide wires 12 atop the support posts 14. The top wires 16 supporting the hop plants 22 are held aloft by the equipment while the guide wires 12 are resecured atop the support posts 14. The top wires 16 are then laid back into the apertures 48 of the wire hanger 30 at each crossing 20. The invention thereby is believed to provide a substantial time and labor savings over the wire ties and nut-and-bolt clamps of the prior art.

Figure 7A:
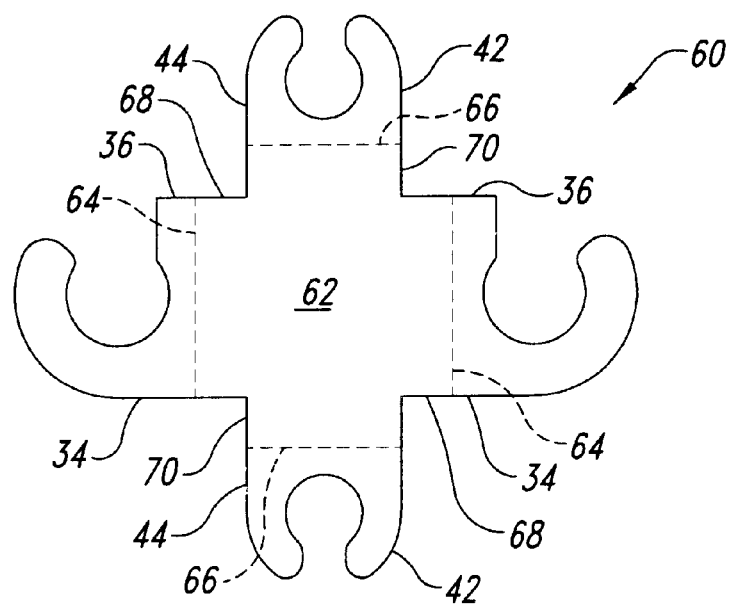
FIG. 7A illustrates a flat pattern before final forming of another embodiment of the wire hanger of the invention.

FIG. 7A illustrates a flat pattern before the final forming operation for one embodiment of a wire hanger 60 of the invention. The wire hanger 60 may also be used at the crossing 20 of guide wire 12 and top wire 16, as shown in FIGS. 1 and 2. However, those skilled in the art will appreciate that the wire hanger of the present invention (e.g., the wire hanger 30 or the wire hanger 16) may be used in any application where it is desirable to maintain wires in a fixed relationship with each other. The wire hanger 60 includes the two pairs of tabs 34 and 42, as described above, joined to a cruciform center portion 62 at respective bend lines 64 and 66, respectively. The cruciform center portion 62 is formed with short arm extensions 68, each about ¼ inch long as measured from the body of center portion 62 to the respective bend lines 64 and 66. The arm extensions 68 provide a small degree of flexibility in the wire hanger 60.

Figure 7B:
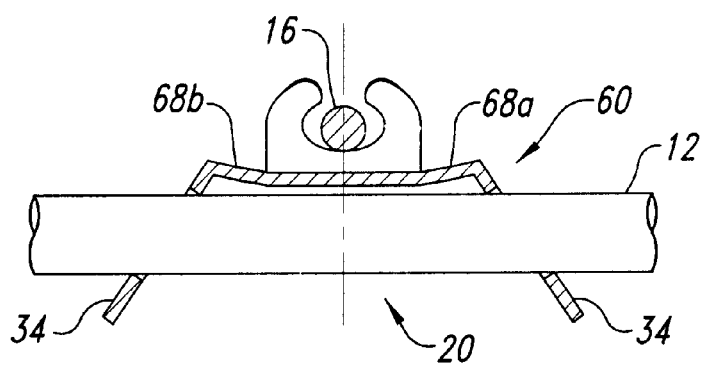
FIG. 7B illustrates the wire hanger of FIG. 7A as installed on two crossing wires.

FIG. 7B illustrates the effect of arm extensions 68 of tabs 34 when wire hanger 60 is installed onto the guide wire 12 at the crossing 20 with the top wire 16. The arm extensions 68 flex when the wire 12 is inserted into the wire hanger 60. The flexing action of the arm extensions 68 exerts a force on the tabs 34 that helps to retains the wire 12 in a fixed position with respect to the hanger 60. The wire hanger 60 may also include the sharp edges 56 (see FIG. 6B) to further maintain the guide wire 12 and top wire 16 in fixed engagement with the wire hanger.

Figure 8A:
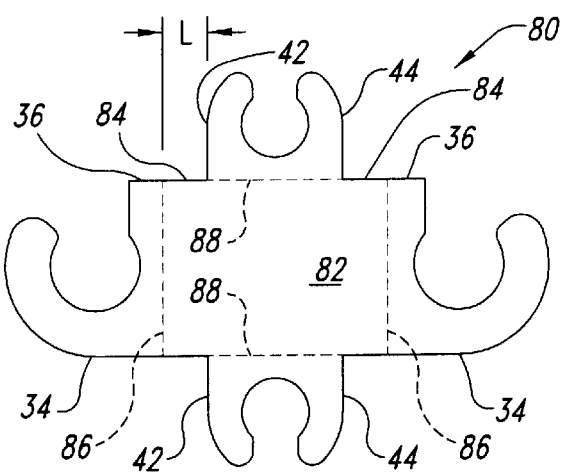
FIG. 8A illustrates a flat pattern before final forming of yet another embodiment of the wire hanger of the invention.

FIG. 8A illustrates a flat pattern for a wire hanger 80 illustrating of the invention prior to the bending process used to form included angles a and b. The wire hanger 80 has an elongated rectangular center portion 82 that includes a pair of similarly formed arm extensions 84 projecting from opposite sides of the center portion 82, between the center portion 82 and corresponding tabs 34. The arm extensions 84 have a predetermined length, L, between the edges of the base portions 44 of respective tabs 42 and the bend lines 86 of the tabs 34. Each of the arm extensions 84 has an associated stiffness that decreases as the length L increases. Thus, the arm extensions 84 provide the center portion 82 with a degree of flexibility, even after the tabs 42 are bent about respective bend lines 88.

Figure 8B:
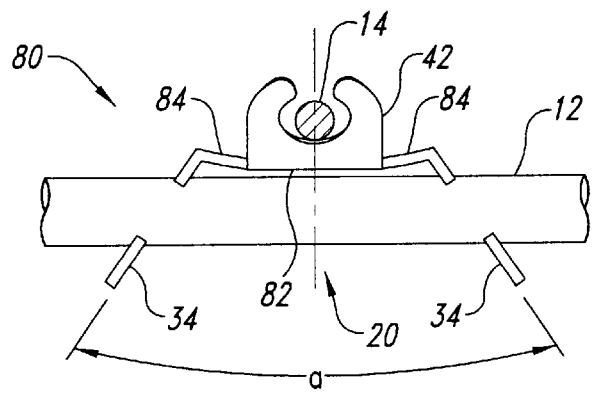
FIGS. 8B and 8C together illustrate the wire hanger of FIG. 8A as installed on two crossing wires.
Figure 8C:
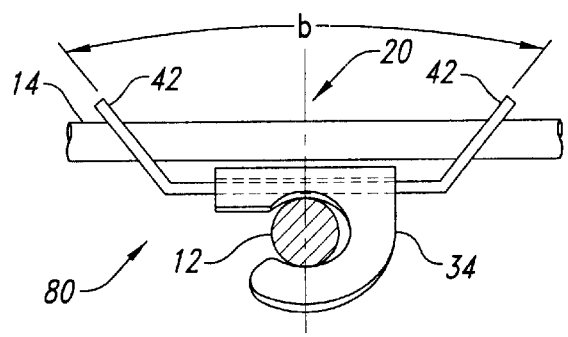

The arm extensions 84 permit flexing of the wire hanger 80 along a line between the tabs 34. FIG. 8C illustrates the flexibility provided to opposing tabs 34 when they are formed with the arm extensions 84. The amount of flex in the wire hanger 80 between the tabs 34 in FIG. 8B may be somewhat exaggerated to illustrate the concept underlying the introduction of the arm extensions 84. The present invention is not limited by the length L of the arm extensions 84 or the degree of flexing.

In contrast, the lack of arm extensions between the center portion 82 and the tabs 42 results in stiffness of the wire hanger 80 along a line between the center portion 82 and the tabs 42 when the tabs are bent to form the included angle b therebetween. FIG. 8C illustrates the stiffness of the center portion 82 between the opposing tabs 42 when the tabs 42 are formed directly off of the center portion 82 without an intermediate arm extension.

Figure 9A:
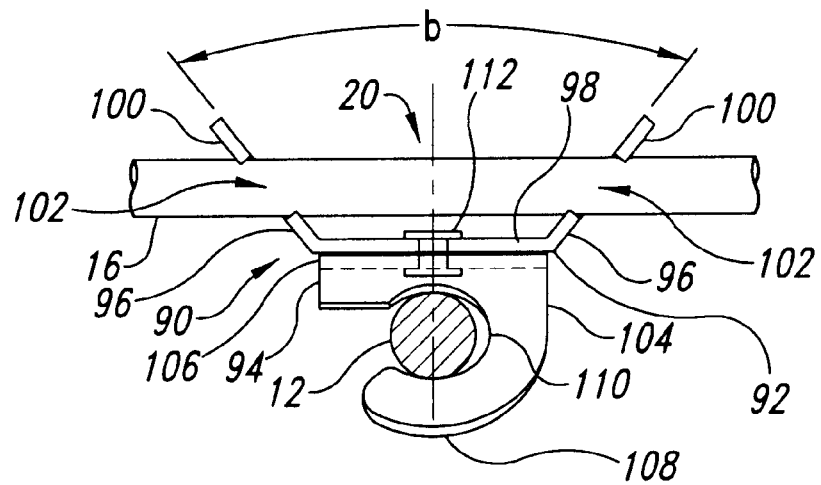
FIGS. 9A and 9B together illustrate another embodiment of the wire hanger of the invention as installed on two crossing wires.

FIG. 9A illustrates one embodiment of another wire hanger 90 of the invention. In FIG. 9A, the wire hangar 90 is assembled between the guide wire 12 and the top wire 16, or another pair of wires, at the crossing point 20. The wire hanger 90 is configured for use at wire crossings 20 that form angles that cannot be accommodated by the fixed orientations of apertures 40 and 48 provided by the above-described embodiments. The wire hanger 90 is formed of two individual wire clips 92 and 94 rotatably joined together. The two individual wire clips 92 and 94 of the wire hanger 90 illustrated in FIG. 9A are formed with a swivel feature that accommodates any variation in the crossing angle between two wires, ranging from parallel to perpendicular.

Figure 9B:
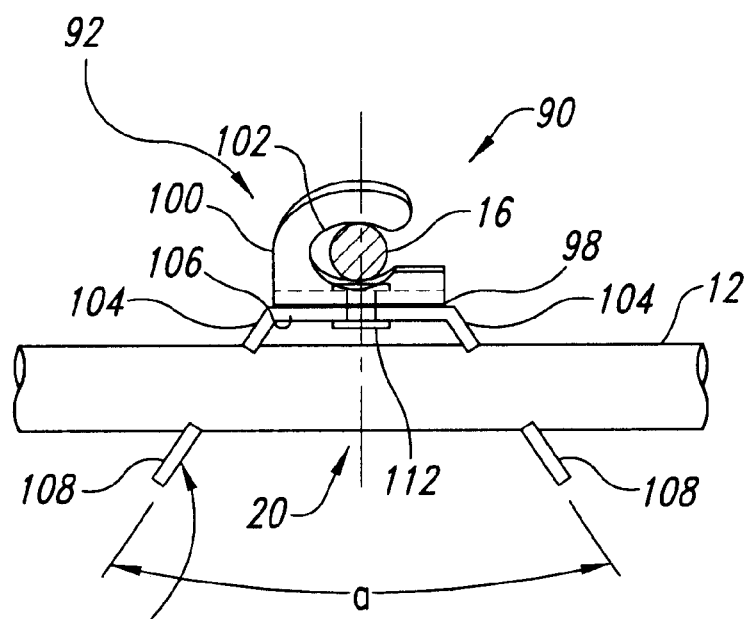

According to the embodiment illustrated in FIG. 9A, the first wire clip 92 is formed with a pair of opposing tabs 96 extending from a center portion 98 and bent to form the included angle b. Each of the opposing tabs 96 is formed with a respective hook portion 100 that defines an opening into a respective aperture 102. As best seen in FIG. 9B, the second wire clip 94 is similarly formed with a pair of opposing tabs 104 (one shown) extending from a center portion 106 and bent to form the included angle a. Each of the opposing tabs 104 is formed with a respective hook portion 108 that defines an opening into a respective aperture 110.

The two wire clips 92 and 94 are joined together to form the wire hanger 90 of the invention. The wire clips 92 and 94 are each pierced at the approximate center of their respective center portions 98 and 106 and joined in a manner that permits relative angular rotation. For example, the two wire clips 92 and 94 are joined by a pivot member 112 that passes through apertures formed in respective wire clips 92 and 94 and is affixed therebetween in a manner that provides at least 0° to 90°, but may permit 360°, relative rotation between the two wire clips 92 and 94. According to one embodiment of the invention, the pivot member 112 is either a rivet, a nut-and-bolt combination, or another equivalent pivot member that secures the two wire clips 92 and 94 to one another while permitting the desired degree of rotational freedom. Thus, the two opposing wire clips 92 and 94 are rotatable relative to one another about the pivot member 112, such that the wire hangar 90 accommodates wires 12 and 16 that cross at angles substantially different from 90° and cannot be accommodated by the fixed relative orientation of the apertures in the various integral wire hangars 30, 60, 80 described above.

Figure 9C:
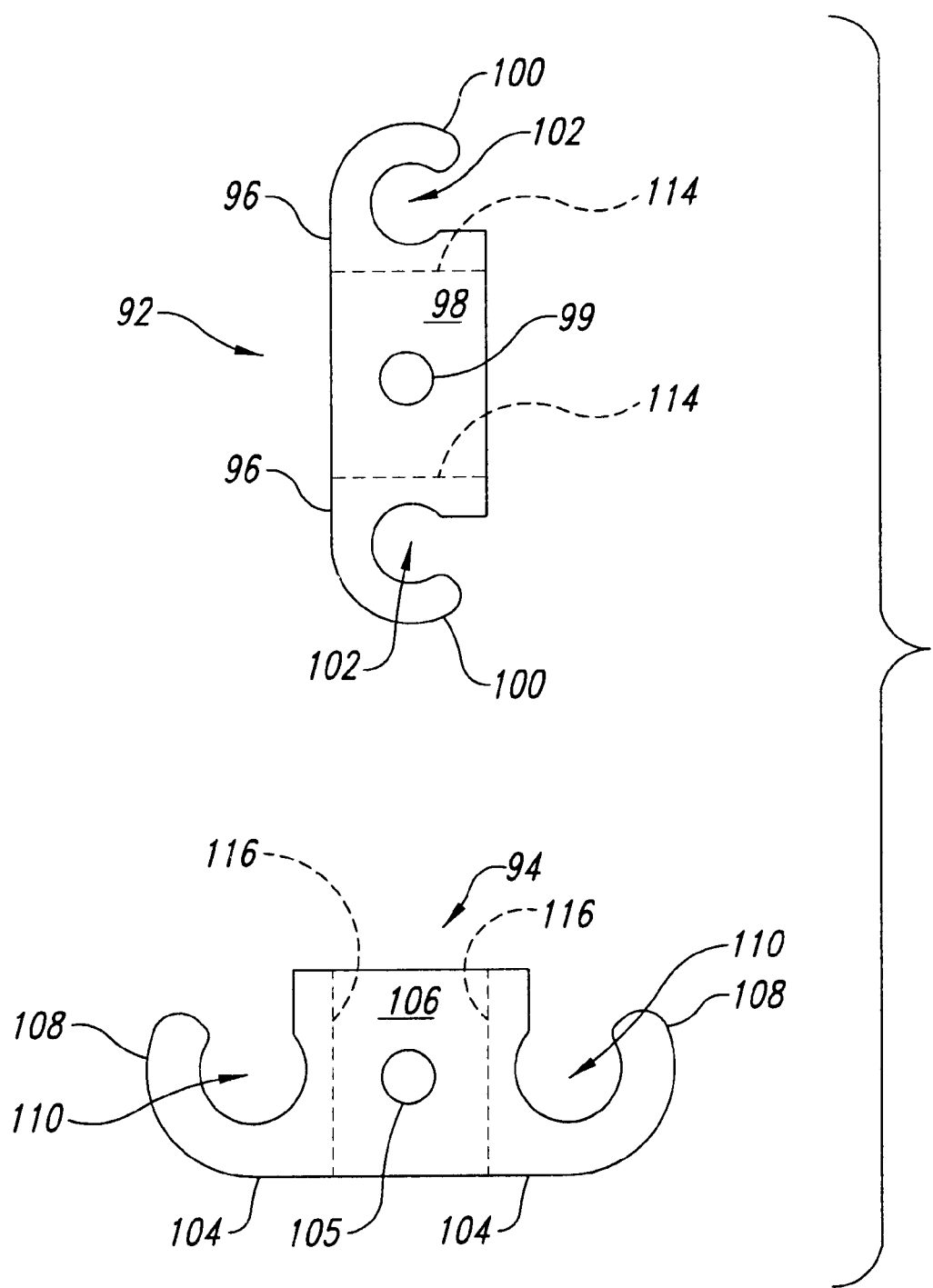
FIG. 9C illustrates the wire hanger of FIGS. 9A and 9B in a flat pattern before final forming.

FIG. 9C illustrates one embodiment of the flat pattern of the wire clips 92 and 94 illustrated in FIGS. 9A and 9B before the bending process to form included angles a and b. The wire clip 92 is formed as an elongated rectangular center portion 98 that is pierced with an aperture 99 at or near its center to accept the pivot member 112. The center portion 98 includes the pair of opposing tabs 96, each having the respective curved (shown) or angular hook portion 100 that defines an opening into the respective curved (shown) or angular aperture 102. The second wire clip 94 is similarly formed as an elongated rectangular center portion 104 that is pierced with an aperture 105 at or near its center to accept the pivot member 112. The center portion 104 includes the pair of opposing tabs 106 with the respective curved (shown) or angular hook portion 108 that defines an opening into the respective curved (shown) or angular aperture 110.

According to the embodiment illustrated in FIG. 9C, the openings into the apertures 110 both face in the same direction, whereby a wire, such as guide wire 12, is engaged using a force acting perpendicularly to the wire presented simultaneously at the mouths of both of the apertures 110, as opposed to the twisting or rotational force that would be required to engage a wire if the openings faced in opposite directions. According to the embodiment illustrated in FIG. 9C, the openings into apertures 102 of the wire clip 92 also both face in the same direction, whereby a wire, such as top wire 16, is engaged using a force acting perpendicularly to the wire presented simultaneously at the mouths of both of the apertures 102. Other embodiments of the wire hangar 90 of the invention include opposing tab portions 96 having openings into the apertures 102 that face in opposite directions, as described above. Yet other embodiments of the wire hangar 90 include the pair of opposing hook portions 46 described above, such that installation on a wire is accomplished using a force perpendicular to the plane of center portion 98, as described above.

To form the wire hanger 90, tabs 96 of the wire clip 92 are bent toward one another about respective bend lines 114 to form the included angle b therebetween, as shown in FIG. 9A. The tabs 104 of the wire clip 94 are bent together about respective bend lines 116 in an opposite direction from the tabs 96 of the wire clip 92 to form included angle a therebetween, as shown in FIG. 9B.

Figure 10A:
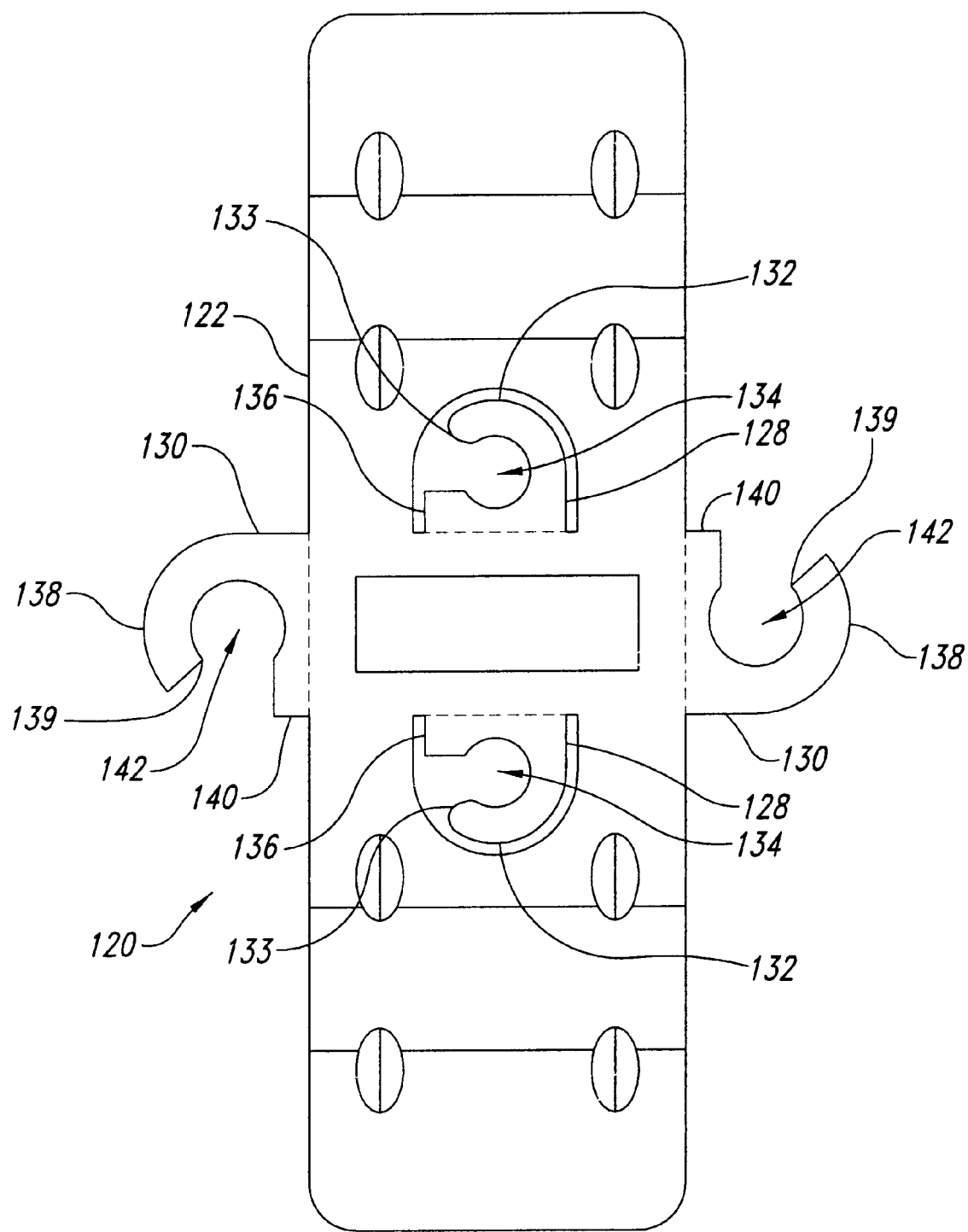
FIGS. 10A, 10B and 10C together illustrate one embodiment of the rebar support chair of the invention.
Figure 10B:
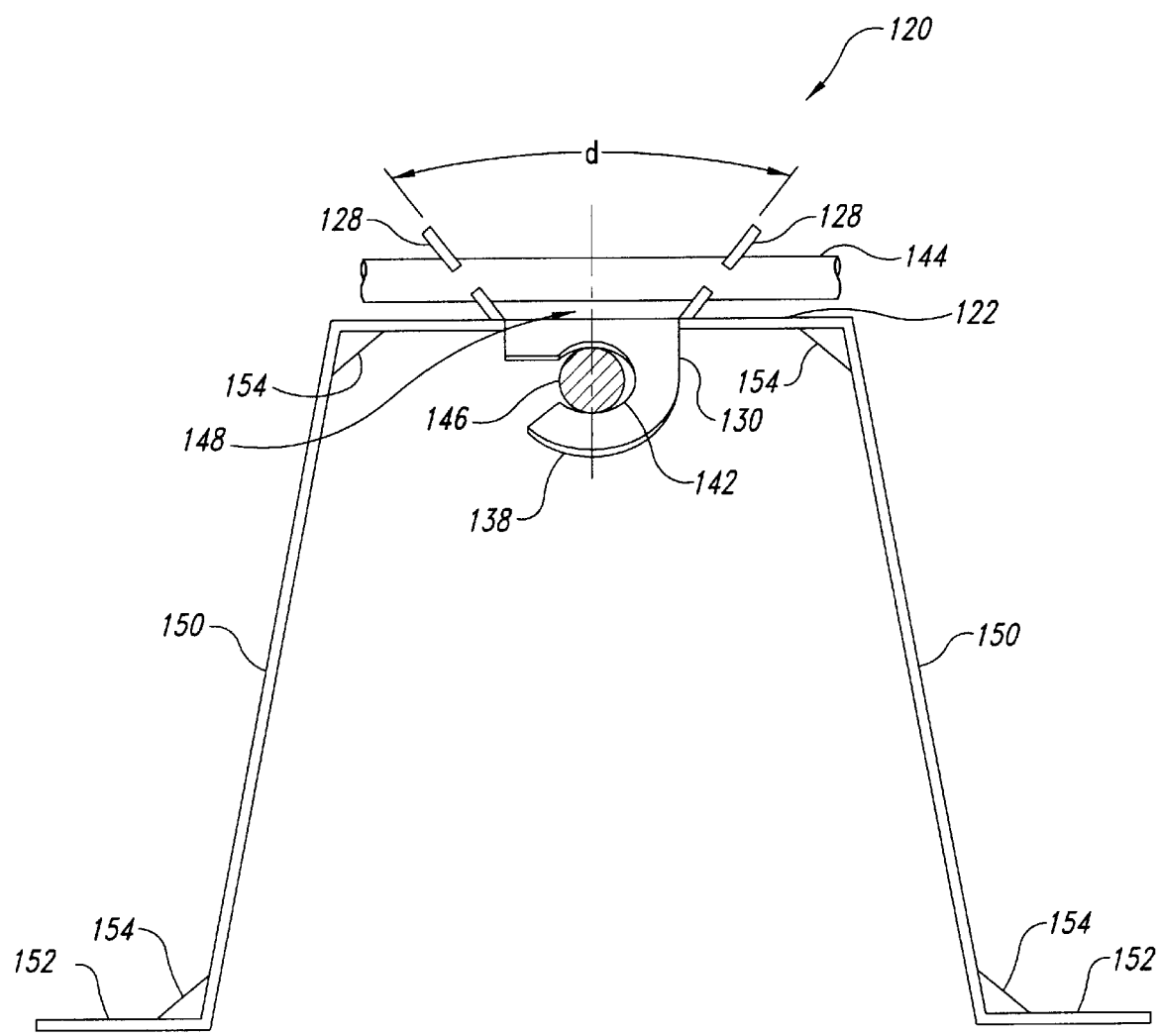
Figure 10C:
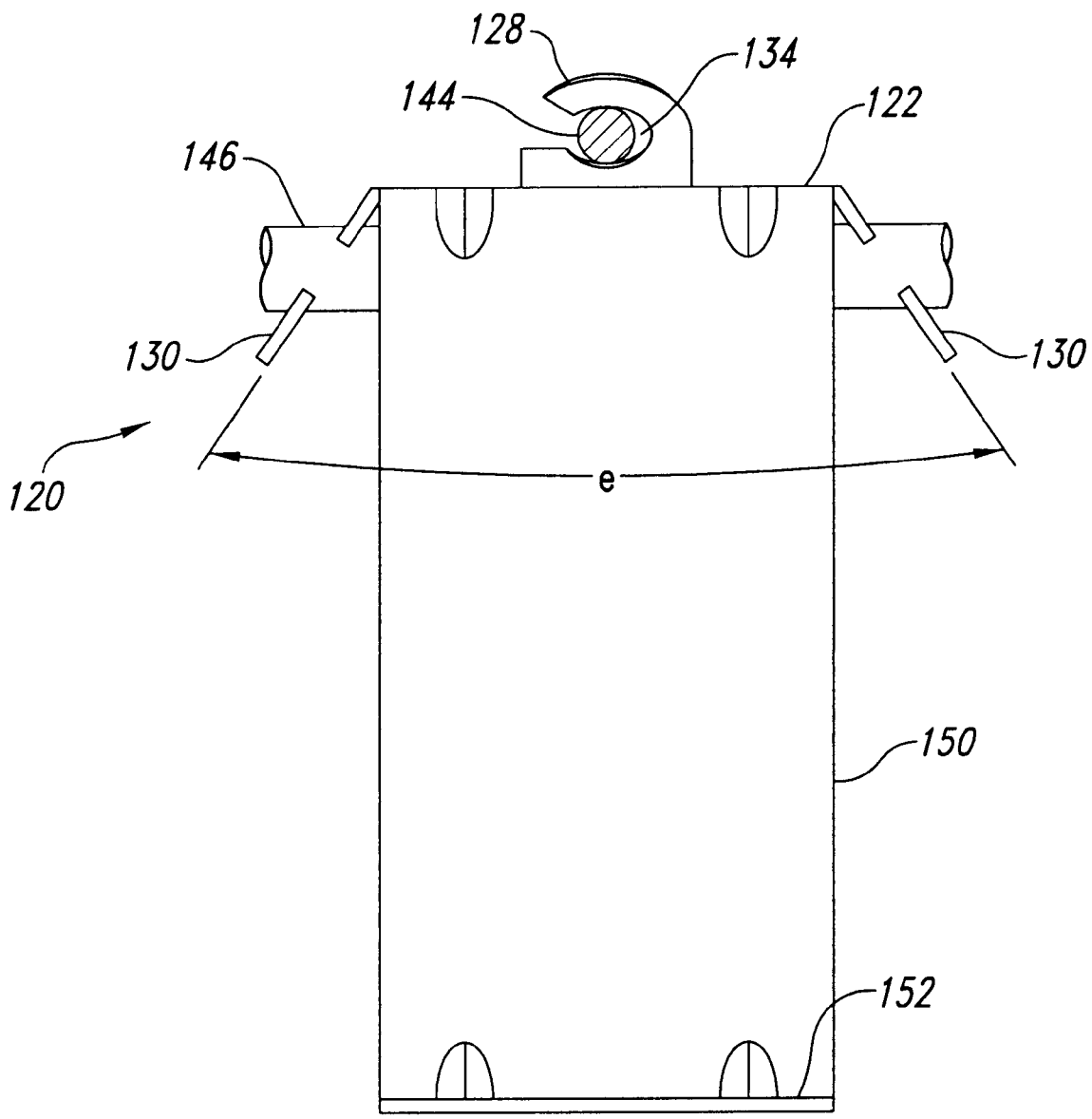

FIGS. 10A, 10B and 10C together illustrate one embodiment of a rebar support chair 120 of the invention. FIG. 10A illustrates a flat pattern shape of a top portion 122 of the support chair 120 at a manufacturing stage prior to bending. The top portion 122 of the support chair 120 is a generally planar portion formed with two pairs of tabs 128 and 130. Each of the tabs 128 and 130 is formed with a hook section for supporting a pair of rebars at a crossing point. For example, the tabs 128 each include a hook portion 132 with an opening formed between a tip 133 of the hook portion 132 and a base portion 136 for accepting a section of rebar (shown in FIGS. 10B, 10C) into a curved generally oval or circular (shown), or angular (not shown) aperture 134 therein. The opening is sufficiently large to force a section of rebar of a predetermined diameter into the apertures 134. According to one embodiment, the opening into each aperture 134 faces in the same direction, such that a force perpendicular to the respective openings causes the rebar to enter into the respective apertures 134, as illustrated in FIG. 10B. Alternatively, the openings into the apertures 134 face in opposite directions (not shown), such that a twisting motion is used to force the rebar through the openings into the respective apertures 134.

The second pair of tabs 130 are formed crosswise to the first pair of tabs 128. Each of the second pair of tabs 130 includes a hook portion 138 having a tip portion 139 facing an opposing base portion 140 to define an opening into an aperture 142. According to the embodiment of the invention illustrated, the openings into the second pair of apertures 142 are formed in oppositely facing directions such that a twisting motion is used to engage respective apertures 142 with a portion of a rebar. Alternatively, the openings into apertures 142 are configured to face in a single direction (not shown) such that a force acting perpendicularly to the respective openings is used to insert the rebar into the respective apertures 142.

FIG. 10B is a side view of the embodiment of the rebar support chair 120 illustrated in FIG. 10A. In FIG. 10B the pairs of tabs 128 and 130 are bent in opposite angular directions with respect to the top portion 122 to capture respective rebars 144 and 146 at a crossing point 148. For example, the pair of tabs 128 are bent upwardly relative to the top portion 122 of the support chair 120 to form the included angle d therebetween. Included angle d is nominally about the same as included angle b described above in connection with the wire hanger of FIGS. 3–8. However, because the support chair 120 is used with rebar, which has periodic, radially protruding nubs (not shown) that catch in the tabs 128 and 130, the included angle d optionally varies considerably from the range of 47°–51° described above for the included angle b. The included angle d ensures that the apertures 134 and respective tabs 128 in combination present a smaller cross-sectional area to the diameter of the engaged rebar 144 than either would individually. In other words, the apertures 134 are sized in the direction perpendicular to the top 122 of the support chair 120 larger than the diameter of the rebar 144 engaged therewith, but present a smaller cross-sectional area because of the angle of presentation, as described above.

The other pair of tabs 130 are bent downwardly relative to the plane of the top portion 122 of the rebar support chair 120, oppositely from the first pair of tabs 128. As shown in FIG. 10C, the downwardly bent tabs 130 include the angle e therebetween. Included angle e is nominally about the same as included angle a described above in connection with the wire hanger of FIGS. 3–8. But, like included angle d, the included angle e may vary considerably from the range described above for the included angle a. The included angle e ensures that the apertures 142 in the tabs 130 present a passage that is smaller than the diameter of the rebar 146 engaged therewith. The rebars 144 and 146 are supported by the chair 120 above a predetermined surface, such as the ground, by a pair of legs 150 formed on opposite ends of the top portion 122. According to one embodiment, a foot portion 152 is formed at the bottom of each leg 150 to support the chair 120 relative to the ground. One or more stiffeners 154 is formed between the top portion 122 and each leg 150. Stiffeners 154 are also formed between the legs 150 and the respective foot portions 152.

Various configurations of the rebar support chair 120 are intended by the invention, wherein the leg portions 150 are formed having various lengths between the top portion 122 and the respective foot 152, such that the two rebars 144, 146 are supported at different predetermined heights above the ground. Additionally, the pairs of tabs 128 and 130 are formed with variously sized apertures 134 and 142 to accommodate various diameters of rebar. For example, the apertures 134 may be the same size as the apertures 142 if the rebars 144 and 146 are the same size.

The pairs tabs 128 and 130 are illustrated in FIGS. 10A–10C as integrally formed with the chair 120. At a fixed angular orientation with respect to each other. However, one or both of the pairs of tabs 128 and 130 may be separately formed and coupled to the chair 120 with the pivot member 112 (see FIGS. 9A–9B) to permit rotation of the tabs with respect to each other.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A wire hanger comprising:
a substantially planar center portion having first and second pairs of opposing peripheral edges;
a first pair of wire clips extending from the first pair of opposing edges and angled upwardly relative to the planar center portion, each of the first pair of wire clips including a hook portion; and
a second pair of wire clips extending from the second pair of opposing edges and angled downwardly relative to the planar center portion, each of the second pair of wire clips including a hook portion.

2. A wire hanger comprising:
a substantially planar center portion having first and second pairs of opposing peripheral edges;
a first air of wire clips extending from the first pair of opposing edges and angled upwardly relative to the planar center portion, each of the first pair of wire clips including a hook portion; and
a second pair of wire clips extending from the second pair of opposing edges and angled downwardly relative to the planar center portion, each of the second pair of wire clips including a hook portion
wherein at least some of the hook portions are formed with a sharp edge.

3. The wire hanger of claim 2 wherein each of the first pair of wire clips is angled upwardly relative to the planar center portion at a substantially equal angle.

4. The wire hanger of claim 2 wherein the hook portion of each of the first pair of wire clips further comprises first and second spaced apart hook portions forming an opening therebetween.

5. The wire hanger of claim 4 wherein the first hook portion of each of the first pair of wire clips faces the second hook portion across a plane perpendicular to the center portion and passing between the first and second hook portions of each of the first pair of wire clips.

6. The wire hanger of claim 2 wherein each of the second pair of wire clips is angled downwardly relative to the planar center portion at a substantially equal angle.

7. The wire hanger of claim 2 wherein the hook portion of each of the second pair of wire clips further comprises a base portion positioned adjacent to the peripheral edge of the center portion and spaced apart from a tip of the hook portion.

8. The wire hanger of claim 7 wherein openings formed in the hook portions of each of the second pair of wire clips between the respective base and tip portions both face in a same direction.

9. The wire hanger of claim 7 wherein openings termed in the hook portions of each of the second pair of wire clips between the respective base and tip portions face in opposite directions.

10. The wire hanger of claim 9, further comprising a pair of leg portions extending from the first pair of edges and angled downwardly relative to the planar center portion.

11. A wire hanger comprising:
a substantially planar center portion wherein the center portion is configured with a cruciform shape having a first and a second pair of opposing peripheral edges, each of the first and second pairs of opposing peripheral edges having respective first and second pairs of wire clips extending therefrom comprising peripheral edges formed at extremities of the cruciform shape wherein the first pair of wire clips extending from the first pair of opposing edges is angled upwardly relative to the planar center portion;
each of the first pair of wire clips includes a hook portion;
a second pair of wire clips extending from the second pair of opposing edges is angled downwardly relative to the planar center portion; and
each of the second pair of wire clips includes a hook portion.

12. A wire hanger comprising:
a substantially rectangular sheet of steel formed with first and second opposing substantially planar surfaces joined at first and second opposing pairs of peripheral edges;
a first air of opposing hook-shaped wire clips extending from the first opposing pair of peripheral edges, each of the first pair of wire clips formed at a predetermined angle away from the first planar surface of the sheet; and
a second pair of opposed hook-shaped wire clips extending from the second opposing pair peripheral edges, each of the second pair of wire clips formed at a predetermined angle away from the second planar surface of the sheet
wherein the hook-shaped wire clips of one of the first and second pairs of opposed hook-shaped wire clips are formed with a sharp edge.

13. The wire hanger of claim 12 wherein each of the first pair of opposed hook-shaped wire clips further comprises a first hook portion facing toward but spaced apart from a second hook portion.

14. The wire hanger of claim 13 wherein each of the second pair of opposed hook-shaped wire clips further comprises a hook portion facing toward hut spaced away from a base portion, the hook portion extending away from a corresponding one of the second pair of peripheral edges and the base portion positioned in proximity to the corresponding peripheral edge.

15. The wire hanger of claim 14 wherein the rectangular sheet of steel extends a predetermined distance on either side of the first pair of opposed hook-shaped wire clips, such that a flexible portion of the sheet extends between the first pair of opposed hook-shaped wire clips and each of the second pair of peripheral edges from which the second pair of wire clips are angled.

16. A wire hanger comprising:
a sheet of steel having first and second opposite sides and formed in a generally rectangular shape having first and second pairs of opposing peripheral edges, the first pair of opposing peripheral edges shorter than the second pair of opposing peripheral edges;
a first pair of tabs extending from the shorter first pair of opposing peripheral edges, the first pair of tabs bent at an angle toward the first side of the sheet and formed with respective first sharp-edged hook portions; and
a second pair of tabs extending from the longer second pair of opposing peripheral edges, the second pair of tabs having a width that is shorter than the second pair of opposing peripheral edges and positioned intermediate between the first pair of opposing peripheral edges, the second pair of tabs bent at an angle toward the second side of the sheet and formed with respective second sharp-edged hook portions, whereby respective portions of the sheet between the second pair of tabs and each of the first pair of tabs is flexible relative to a portion of the sheet between the second pair of tabs.

17. The wire hanger of claim 16, further comprising a pair of base portions extending from the shorter first pair of opposing peripheral edges and bent at an angle toward the first side of the sheet, each of the base portions cooperating with a respective one of the first hook portions to form an opening an opening into the respective first hook portion.

18. The wire hanger of claim 17 wherein each of the second hook portions of the second pair of tabs further comprises a pair of opposing spaced-apart hook portions.

19. The wire hanger of claim 18 wherein the opening into each of the respective first hook portions faces in the same direction.

* * * * *

UNITED STATES PATENT AND TRADEMARK OFFICE
CERTIFICATE OF CORRECTION

PATENT NO. : 6,622,352 B2
DATED : September 23, 2002
INVENTOR(S) : David M. Herron It is certified that error appears in the above-identified patent and that said Letters Patent is hereby corrected as shown below:

Column 11,
Lines 8-19, please insert the following:

"A wire hanger comprising:
a substantially planar center portion having first and second pairs of opposing peripheral edges;
a first pair of wire clips extending from the first pair of opposing edges and angled upwardly relative to the planar center portion, each of the first pair of wire clips including a hook portion; and
a second pair of wire clips extending from the second pair of opposing edges and angled downwardly relative to the planar center portion, each of the second pair of wire clips including a hook portion." should read as
--A wire hanger comprising:
a substantially rectangular sheet of steel formed with first and second opposing substantially planar surfaces joined at first and second opposing pairs of peripheral edges;
a first pair of opposed hook-shaped wire clips extending from the first opposing pair of the peripheral edges, each of the first pair of wire clips formed at a predetermined angle away from the first planar surface of the sheet;
a second pair of opposed hook-shaped wire clips extending from the second opposing pair of peripheral edges, each of the second pair of wire clips formed at a predetermined angle away from the second planar surface of the sheet; and
a pair of leg portions extending at a predetermined angle away from one of the first and second opposing planar surfaces of the sheet.--

Line 23, "first air" should read as -- first pair --
Line 58, "termed" should read as -- formed --

Column 12,
Line 21, "air of opposing" should read as -- pair of opposed --
Line 23 "of wire" should read as -- of the wire --
Line 27, "pair peripheral" should read as -- pair of peripheral --

Signed and Sealed this

Tenth Day of August, 2004

JON W. DUDAS
*Acting Director of the United States Patent and Trademark Office*